US012751433B2

(12) United States Patent
Ishiwaka

(10) Patent No.: US 12,751,433 B2
(45) Date of Patent: Oct. 6, 2026

(54) NON-TRANSITORY COMPUTER READABLE STORAGE, ESTIMATION METHOD, AND INFORMATION PROCESSING DEVICE

(71) Applicant: SoftBank Corp., Tokyo (JP)

(72) Inventor: Yuko Ishiwaka, Tokyo (JP)

(73) Assignee: SOFTBANK CORP., Tokyo (JP)

( * ) Notice: Subject to any disclaimer, the term of this patent is extended or adjusted under 35 U.S.C. 154(b) by 1108 days.

(21) Appl. No.: 17/792,739

(22) PCT Filed: Jan. 22, 2021

(86) PCT No.: PCT/JP2021/002311
§ 371 (c)(1),
(2) Date: Jul. 14, 2022

(87) PCT Pub. No.: WO2021/149816
PCT Pub. Date: Jul. 29, 2021

(65) Prior Publication Data

US 2023/0048582 A1 Feb. 16, 2023

(30) Foreign Application Priority Data

Jan. 23, 2020 (JP) ................................ 2020-009213

(51) Int. Cl.
*A01K 61/95* (2017.01)
*G06V 40/10* (2022.01)

(52) U.S. Cl.
CPC .............. *A01K 61/95* (2017.01); *G06V 40/10* (2022.01)

(58) Field of Classification Search
None
See application file for complete search history.

(56) References Cited

U.S. PATENT DOCUMENTS

2016/0227746 A1* 8/2016 Herbst .................. A01K 61/95
2017/0103257 A1 4/2017 Kasin et al.

(Continued)

FOREIGN PATENT DOCUMENTS

JP 2003-250382 A 9/2003
JP 2011-197892 A 10/2011

(Continued)

OTHER PUBLICATIONS

Davidson et al. ("Abnormal swimming behavior and increased deformities in rainbow trout *Oncorhynchus mykiss* cultured in low exchange water recirculating aquaculture systems." Aquacultural engineering 45.3 (2011): pp. 109-117) (Year: 2011).*

(Continued)

*Primary Examiner* — Leon Viet Q Nguyen
(74) *Attorney, Agent, or Firm* — XSENSUS LLP

(57) ABSTRACT

An estimation program according to the application concerned causes a computer to execute an obtaining step and an estimating step. The obtaining step includes obtaining behavior information which indicates the behavior exhibited by a specific fish species having a predetermined physical abnormality. The estimating step includes estimating, based on the behavior information obtained at the obtaining step and based on state information indicating the state of the target fish for processing, behavioral features of the target fish for processing that are attributable to the predetermined physical abnormality seen in the target fish for processing.

20 Claims, 10 Drawing Sheets

EX.) EXAMPLE OF MUTANT MODELS

| MUTANT MODEL | PHYSICAL ABNORMALITY |
|---|---|
| MD11 | BREAST FIN ABNORMALITY |
| MD12 | DORSAL FIN ABNORMALITY |
| MD13 | TAIL FIN ABNORMALITY |
| MD14 | OUTLINE MUTATION |

(56) References Cited

U.S. PATENT DOCUMENTS

| | | | | |
|---|---|---|---|---|
| 2019/0259384 | A1* | 8/2019 | Singh | G06N 3/08 |
| 2020/0113158 | A1* | 4/2020 | Rishi | G06V 40/20 |
| 2021/0209351 | A1* | 7/2021 | Young | G06T 7/70 |

FOREIGN PATENT DOCUMENTS

| | | | | | |
|---|---|---|---|---|---|
| JP | 2019-135986 | A | | 8/2019 | |
| WO | WO2015176637 | A1 | * | 11/2015 | G06K 9/78 |
| WO | 2017/003113 | A1 | | 1/2017 | |
| WO | 2019/198611 | A1 | | 10/2019 | |
| WO | 2019/198701 | A1 | | 10/2019 | |

OTHER PUBLICATIONS

International Search Report and Written Opinion mailed on Apr. 6, 2021, received for PCT Application PCT/JP2021/002311, filed on Jan. 22, 2021, 8 pages including English Translation.
Extended European search report issued on Jan. 4, 2024, in corresponding European patent Application No. 21745116.0, 9 pages.

* cited by examiner

EX.) EXAMPLE OF MUTANT MODELS

| MUTANT MODEL | PHYSICAL ABNORMALITY |
|---|---|
| MD11 | BREAST FIN ABNORMALITY |
| MD12 | DORSAL FIN ABNORMALITY |
| MD13 | TAIL FIN ABNORMALITY |
| MD14 | OUTLINE MUTATION |

| FEATURE TYPE | FEATURE QUANTITY |
|---|---|
| PHYSICAL FEATURE QUANTITY | BFV1 |
| | BFV2 |
| | BFV3 |
| | ... |
| BEHAVIOR FEATURE QUANTITY | AFV1 |
| | AFV2 |
| | AFV3 |
| | ... |

FIG.7

121

| MUTANT ID | PHYSICAL INFORMATION (PHYSICAL ABNORMALITY) | VIDEO | RESULT OF SIMULATION | BEHAVIOR INFORMATION (SWIMMING-STYLE DATA) |
|---|---|---|---|---|
| MD11 | BREAST FIN ABNORMALITY | MDVD11 | SMRE11 | STDA11 |
| MD12 | DORSAL FIN ABNORMALITY | MDVD12 | SMRE12 | STDA12 |
| MD13 | TAIL FIN ABNORMALITY | MDVD13 | SMRE13 | STDA13 |
| MD14 | OUTLINE MUTATION | MDVD14 | SMRE14 | STDA14 |
| ... | ... | ... | ... | ... |

FIG.8

124

| GENDER | | BEHAVIOR GROUP | | | |
|---|---|---|---|---|---|
| MALE | FEMALE | FV11 | FV12 | FV13 | ··· |
| FS2··· | FS1··· | FS2··· | FS1··· | FS4··· | ··· |

NON-TRANSITORY COMPUTER READABLE STORAGE, ESTIMATION METHOD, AND INFORMATION PROCESSING DEVICE

CROSS-REFERENCE TO RELATED APPLICATIONS

The present application is based on PCT filing PCT/JP2021/002311, filed Jan. 22, 2021, which claims priority to JP 2020-009213, filed Jan. 23, 2020, the entire contents of each are incorporated herein by reference.

FIELD

The present invention is related to an estimation program, an estimation method, and an information processing device.

BACKGROUND

Conventionally, a technology is available that is related to the extraction of the features of images using a neural network. For example, a technology is available in which the target included in an image is distinguished using a convolutional neural network.

CITATION LIST

Patent Literature

Patent Literature 1: Japanese Patent Application Laid-open No. 2011-197892

SUMMARY

Technical Problem

However, in the conventional technology mentioned above, it is not always the case that the classification of a specific fish species can be easily performed according to the behavior exhibited by that fish species. For example, in the conventional technology mentioned above, object information data is referred to in which image information of object mages is registered in a corresponding manner to keywords; and, according to the keyword input by the user, the image information of the object image indicated by that keyword is obtained. Then, in the conventional technology mentioned above, layout estimation is performed using the information about the average size and the average position of the object images registered in the object information data. As a result, a composite image representing a search request is automatically generated, and an image search is performed using the composite image.

In this way, the conventional technology mentioned above is specialized in performing an image search by taking into account the details and the layout of the objects. Hence, it is not always the case that the classification of a specific fish species can be easily performed according to the behavior exhibited by that fish species.

The application concerned is made in view of the issues mentioned above, and it is an objective to enable easy classification of a specific fish species according to the behavior exhibited by that fish species.

Solution to Problem

An estimation program that causes a computer to execute: an obtaining step that includes obtaining behavior information which indicates behavior exhibited by a specific fish species having a predetermined physical abnormality; and an estimating step that includes estimating, based on the behavior information obtained at the obtaining step and based on state information indicating state of a target fish for processing, behavioral feature of the target fish for processing that is attributable to the predetermined physical abnormality seen in the target fish for processing.

Advantageous Effects of Invention

According to an aspect of the embodiment, classification of a specific fish species can be easily performed according to the behavior exhibited by that fish species.

BRIEF DESCRIPTION OF DRAWINGS

FIG. 7 is a diagram illustrating an example of a behavior information storing unit according to the embodiment.

FIG. 8 is a diagram illustrating an example of a classification result storing unit according to the embodiment.

DESCRIPTION OF EMBODIMENT

Figure 1:
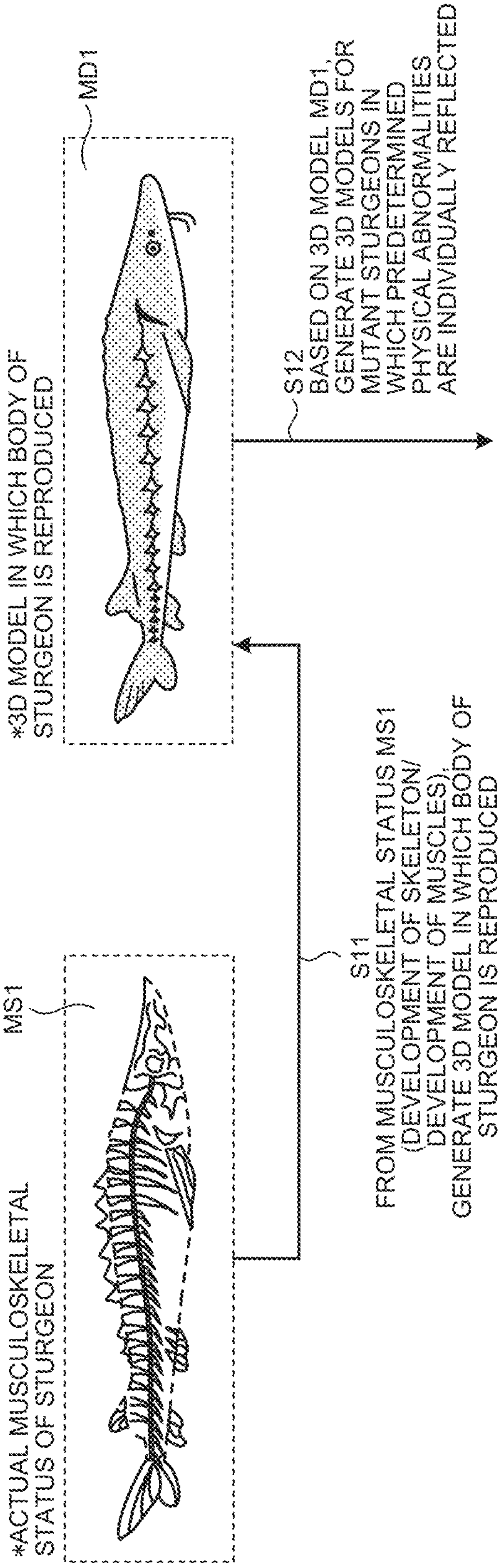
FIG. 1 is a diagram illustrating an example of a 3D model according to an embodiment.

An illustrative embodiment (hereinafter, called "embodiment") of an estimation program, an estimation method, and an information processing device is described below in detail with reference to the accompanying drawings. However, the estimation program, the estimation method, and the information processing device according to the application concerned are not limited by the embodiment described below. In the embodiment described below, identical regions are referred to by the same reference numerals, and their explanation is not repeated.

1. Overview of Estimation Operation According to Embodiment

Firstly, the explanation is given about the overview of an estimation operation according to the embodiment and in line with the premise of the application concerned. Herein, the overview of the estimation operation according to the embodiment is given with reference to the issues faced during the aquafarming of sturgeons representing the specific fish species.

For example, it requires seven years for a sturgeon to lay eggs, and then the egg production occurs only once every three years. Besides, the juvenile fish get readily eradicated due to a change in the environment such as excessive feeding, or a rise in the water temperature, or stoppage of water supply for one day. Moreover, sturgeons keep on growing during their entire lifetime and, from among the female sturgeons, particularly the egg-laying sturgeons grow to be 3 meters or more in size, which results in running up the cost.

Given such a situation, a fish farmer would want to skillfully cultivate only female sturgeons. However, there is no established method for cultivating sturgeons. Moreover, in order to cultivate only female sturgeons, firstly, only the female sturgeons need to be separated from all the sturgeons. In that regard, at present, as a gender determination method for sturgeons, a method is implemented in which the abdomen of each sturgeon is opened and the presence or absence of the ovary is confirmed. However, this method requires a lot of time and efforts. As another gender determination method, a method is implemented in which the presence or absence of the ovary is confirmed using an ultrasonic sensor. However, since each individual sturgeon is large, the measurement requires a lot of efforts. For that reason, for example, there is a demand for enabling easy estimation of the gender of a sturgeon from a video in which the behavior exhibited by the sturgeon is captured.

Most of the sturgeons that are born as a result of aquafarming are known to have some physical abnormality (for example, a bent fin, or a mutated fin, or a visceral disease). Hence, as compared to a sturgeon having no physical abnormality, a sturgeon having a physical abnormality is believed to exhibit characteristic behavior in accordance with the physical abnormality. For example, a sturgeon having a physical abnormality is believed to swim in a style that is in accordance with the physical abnormality.

Thus, an estimation operation according to the embodiment represents information processing in which, in view of the abovementioned issues, the focus is on the possibility that, if the behavior exhibited by the sturgeons having physical abnormalities is analyzed, a sturgeon whose behavioral features or gender is not known can be classified by the behavior or by the gender.

More particularly, in the estimation operation according to the embodiment, behavior information is obtained that indicates the behavior exhibited by a specific fish species (sturgeons) having a predetermined physical abnormality; and, based on the obtained behavior information and based on state information indicating the state of the target fish for processing from among the specific fish species, behavioral features of the target fish for processing are estimated that are attributable to the predetermined physical abnormality seen in the target fish for processing. For example, in the estimation operation according to the embodiment, based on behavior information indicating the behavior exhibited by a specific fish species (sturgeons) having a predetermined physical abnormality and based on state information indicated by a video in which the behavior exhibited by the specific fish species is captured, the behavioral features of the target fish for processing are estimated.

More specifically, in the estimation operation according to the embodiment, based on behavior information corresponding to a specific fish species having a predetermined physical abnormality, a model is generated that is trained in the relationship between the predetermined physical abnormality and the behavior exhibited by the specific fish species having the predetermined physical abnormality; and, based on the generated model and the state information, behavioral features attributable to the predetermined physical abnormality are estimated. Since such a model is meant for estimating the behavioral features, it is sometimes referred to as an "estimation model".

As a result of performing the estimation operation, the specific fish species (sturgeons) can be easily classified by the behavior group or by the gender. As a result of becoming able to perform such classification, for example, a specific behavior represents the index for the fact that the concerned sturgeon is in weak physical condition, and changes can be made in the feeding procedure for the sturgeons belonging to the behavior group corresponding to that specific behavior. Hence, it becomes possible to effectively prevent the eradication of such sturgeons. If it becomes possible to effectively prevent the eradication of sturgeons, the cost required for sturgeon farming can be reduced. Moreover, it also becomes possible to reduce the efforts of the fish farmer required at the time of separating only the female sturgeons (i.e., the efforts required for gender determination).

2. Regarding Estimation Program and Information Processing Device

The estimation program according to the embodiment is a program that causes a computer to execute the estimation operation according to the embodiment as explained above. More particularly, the estimation program according to the embodiment is a program that causes a computer to execute: an obtaining step for obtaining behavioral information that indicates the behavior exhibited by a specific fish species having a predetermined physical abnormality; and an estimation sequence for estimating, based on the behavior information obtained at the obtaining step and based on state information indicating the state of the target fish for processing from among the specific fish species, the behavioral features of the target fish for processing that are attributable to the predetermined physical abnormality seen in the target fish for processing.

In the present embodiment, an information processing device 100 represents an example of the computer mentioned above. Thus, under the control of the estimation program according to the embodiment, the information processing device 100 obtains behavior information indicating the behavior exhibited by a specific fish species having a predetermined physical abnormality; and, based on the obtained behavior information and based on state information indicating the state of the target fish for processing from among the specific fish species, estimates the behavioral features of the target fish for processing that are attributable to the predetermined physical abnormality seen in the target fish for processing. In other words, when the estimation program according to the embodiment is executed, the information processing device 100 resultantly includes an obtaining unit that obtains behavior information indicating the behavior exhibited by a specific fish species having a predetermined physical abnormality; and includes an estimating unit that, based on the behavior information obtained by the obtaining unit and based on state information indicating the state of the target fish for processing from among the specific fish species, estimates the behavioral features of the target fish for processing that are attributable to the predetermined physical abnormality seen in the target fish for processing.

In the embodiment, the information processing device 100 is assumed to be implemented using a server device or a cloud system. Alternatively, the computer in which the estimation program is executed can be, for example, an information processing terminal used by the user (for example, a fish farmer) who wishes to analyze the behavior exhibited by the target fish species for processing. Examples of the information processing terminal include a smartphone, a tablet terminal, a notebook PC (Personal Computer), a desktop PC, a cellular phone, and a PDA (Personal Digital Assistant).

3. Regarding Specific Fish Species

In the present embodiment, the sturgeons are assumed to represent the specific fish species. Thus, in the present embodiment, the target fish for processing from among the specific fish species implies a particular single sturgeon whose behavior is to be analyzed from among the sturgeons being bred in a preserve for aquafarming purposes. However, the specific fish species is not necessarily limited to the sturgeons. For example, any fish species (such as salmons) for which the behavior analysis is believed to be necessary for effective aquafarming can be considered as the specific fish species, or any fish species for which the aquafarming method is yet unestablished can be considered as the specific fish species.

4. Regarding Three-Dimensional Models

As explained above, in the estimation operation according to the embodiment, a model is generated that is trained in the relationship between the predetermined physical abnormality and the behavior indicated by the behavior information corresponding to the sturgeons having the predetermined physical abnormality; and, based on the generated model and the state information, behavioral features attributable to the predetermined physical abnormality are estimated. Hence, in the machine learning that is aimed at generating a model having a high degree of estimation accuracy, it becomes necessary to have combinations (learning datasets) of the physical abnormalities and learning data such as the behavior information indicating the behavior exhibited by the sturgeons having the physical abnormalities. However, it is extremely difficult to collect, from the actual sturgeons, sufficient learning datasets for machine learning.

For example, from among the sturgeons being bred in a preserve for aquafarming purposes, even when sturgeons having an abnormality in the “breast fin” are retrieved, if the number of sturgeons having an abnormality in the “breast fin” is only small, it is not possible to collect a sufficient volume of behavior information. Hence, a model having a high degree of estimation accuracy cannot be generated.

In order to resolve such an issue, in the present embodiment, the focus is on the following: a three-dimensional model (hereinafter, sometimes referred to as a “3D model”) is generated in which the bodies of sturgeons are reproduced from the actual musculoskeletal status of the sturgeons; fluid simulation is performed with respect to the 3D model; and behavior information is collected indicating the behavior exhibited by sturgeons having physical abnormalities. The explanation about the 3D model according to the embodiment is given below with reference to FIG. 1. FIG. 1 is a diagram illustrating an example of the 3D model according to the embodiment. Meanwhile, the task of generating a 3D model is assumed to be performed in a terminal device 10 (not illustrated) in response to an operation performed by a user U who wishes to analyze the behavior exhibited by sturgeons.

A musculoskeletal status MS1 illustrated in FIG. 1 represents an actual musculoskeletal model obtained as a result of dissecting a sturgeon and analyzing the skeleton and the muscle development on the skeleton. Based on the information indicated by the musculoskeletal status MS1, the terminal device 10 generates a 3D model in which the body of a sturgeon is reproduced (Step S11). In FIG. 1, an example is illustrated in which, from the musculoskeletal status MS1, a 3D model MD1 is generated as the 3D model in which the body of a sturgeon is reproduced.

Then, based on the 3D model MD1, the terminal device 10 further generates 3D models for the sturgeons having physical abnormalities (i.e., mutant sturgeons) (Step S12). For example, based on the 3D model MD1, the terminal device 10 generates 3D models of mutant sturgeons in which predetermined physical abnormalities are individually reflected.

As explained earlier, most of the sturgeons that are born as a result of aquafarming are known to have some physical abnormality (for example, a bent fin, or a mutated fin, or a visceral disease). In that regard, in the present embodiment, the user U focuses attention on the following four types of physical abnormalities: breast fin abnormality (for example, the breast fin is bent); dorsal fin abnormality (for example, the dorsal fin is bent); tail fin abnormality (for example, the tail fin is bent); and outline mutation (for example, the outline of the head region is mutated as compared to a normal sturgeon). Moreover, according to the operation performed by the user U, the terminal device 10 generates: a mutant model MD11 representing a 3D model in which only the breast fin abnormality is reflected; a mutant model MD12 representing a 3D model in which only the dorsal fin abnormality is reflected; a mutant model MD13 representing a 3D model in which only the tail fin abnormality is reflected; and a mutant model MD14 representing a 3D model in which only the outline mutation is reflected.

Of course, the potential physical abnormalities in sturgeons are not limited to the four types of physical abnormalities mentioned above. Hence, there can be an arbitrary number of 3D models in which a variety of physical abnormalities are reflected. Meanwhile, in the present embodiment, for ease of explanation, the explanation is given about the generation of such 3D models of mutant sturgeons in which predetermined physical abnormalities are individually reflected. Alternatively, for example, a single 3D model can be generated in which a plurality of physical abnormalities are reflected together. As an example, a 3D model can be generated for a single sturgeon having the breast fin abnormality and the dorsal fin abnormality.

Figure 2:
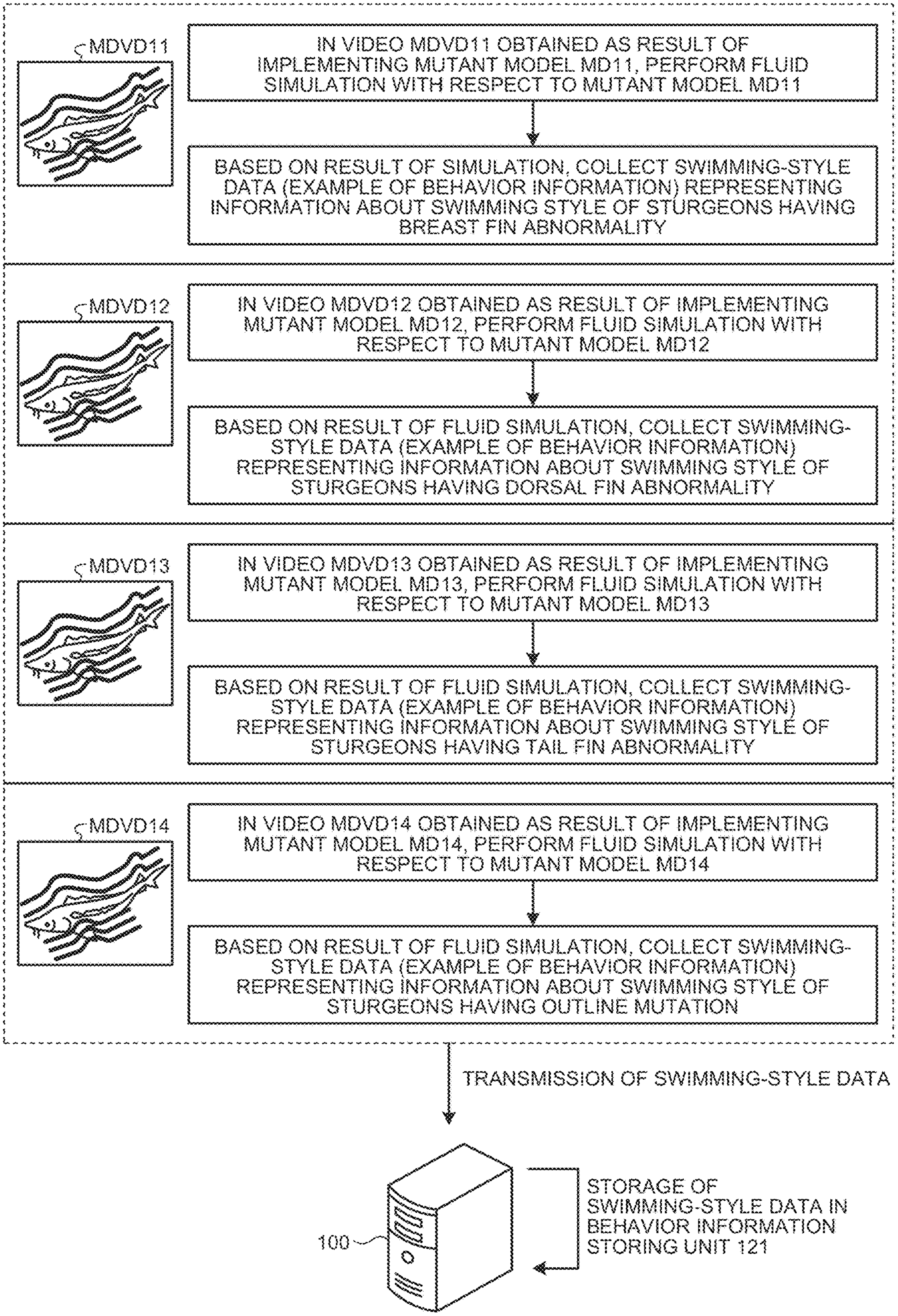
FIG. 2 is a diagram illustrating an example of collecting learning data based on fluid simulation.

5. Collection of Learning Data Based on Fluid Simulation with Respect to Three-Dimensional Models With reference to FIG. 2, the explanation is given about performing fluid simulation with reference to the 3D models generated as explained with reference to FIG. 1, and collecting learning data from the simulation results of the fluid simulation. FIG. 2 is a diagram illustrating an example of collecting learning data based on fluid simulation. Herein, it is assumed that the fluid simulation as well as the collection of learning data based on the fluid simulation is performed in the terminal device 10 (not illustrated) in response to an operation by the user U. The terminal device 10 performs fluid simulation for the mutant model corresponding to each physical abnormality; and, based on the simulation result, virtually analyzes the behavior exhibited by the sturgeons having that physical abnormality. Then, based on the analysis result, the terminal device 10 collects behavior information indicating the behavior exhibited by the sturgeons. For example, in a video obtained as a result of implementing a mutant model, the terminal device 10 performs fluid simulation with respect to the mutant model.

Firstly, the explanation is given about the mutant model MD11. A video MDVD11 illustrated in FIG. 2 is obtained as a result of implementing the mutant model MD11. Thus, in the video MDVD11 obtained as a result of implementing the mutant model MD11, the terminal device 10 performs fluid simulation with respect to the mutant model MD11. Then, based on the simulation result of the fluid simulation, the terminal device 10 collects swimming-style data (an example of the behavior information) representing the information about the swimming style of the sturgeons having the breast fin abnormality. The swimming-style data contains information indicating the swimming style in normal times, information indicating the swimming style at the time of feeding, and information indicating the movement locus of the swimming movement.

The following explanation is given about the mutant model MD12. A video MDVD12 illustrated in FIG. 2 is obtained as a result of implementing the mutant model MD12. Thus, in the video MDVD12 obtained as a result of implementing the mutant model MD12, the terminal device 10 performs fluid simulation with respect to the mutant model MD12. Then, based on the simulation result of the fluid simulation, the terminal device 10 collects swimming-style data (an example of the behavior information) representing the information about the swimming style of the sturgeons having the dorsal fin abnormality. The swimming-style data contains information indicating the swimming style in normal times, information indicating the swimming style at the time of feeding, and information indicating the movement locus of the swimming movement.

The following explanation is given about the mutant model MD13. A video MDVD13 illustrated in FIG. 2 is obtained as a result of implementing the mutant model MD13. Thus, in the video MDVD13 obtained as a result of implementing the mutant model MD13, the terminal device 10 performs fluid simulation with respect to the mutant model MD13. Then, based on the simulation result of the fluid simulation, the terminal device 10 collects swimming-style data (an example of the behavior information) representing the information about the swimming style of the sturgeons having the tail fin abnormality. The swimming-style data contains information indicating the swimming style in normal times, information indicating the swimming style at the time of feeding, and information indicating the movement locus of the swimming movement.

The following explanation is given about the mutant model MD14. A video MDVD14 illustrated in FIG. 2 is obtained as a result of implementing the mutant model MD14. Thus, in the video MDVD14 obtained as a result of implementing the mutant model MD14, the terminal device 10 performs fluid simulation with respect to the mutant model MD14. Then, based on the simulation result of the fluid simulation, the terminal device 10 collects swimming-style data (an example of the behavior information) representing the information about the swimming style of the sturgeons having the outline mutation. The swimming-style data contains information indicating the swimming style in normal times, information indicating the swimming style at the time of feeding, and information indicating the movement locus of the swimming movement.

Moreover, according to an operation performed by the user U, the terminal device 10 sends the collected swimming-style data to the information processing device 100 according to the embodiment. Upon receiving the swimming-style data from the terminal device 10, the information processing device 100 stores the received swimming-style data in a behavior information storing unit 121. For example, for the mutant model corresponding to each physical abnormality, the information processing device 100 stores the swimming-style data obtained as a result of performing fluid simulation with respect to that mutant model.

Explained below with reference to FIG. 7 is an example of the behavior information storing unit 121 according to the embodiment. In the example illustrated in FIG. 7, the behavior information storing unit 121 includes the following items: "mutant ID", "physical information (physical abnormality)", "video", "simulation result", and "behavior information (swimming-style data)".

The item "mutant ID" represents identification information that enables identification of the mutant model. For example, the mutant model identified by a mutant ID "MD11" corresponds to the mutant model MD11. The item "physical information (physical abnormality)" represents information indicating the physical abnormality seen in the mutant model identified by the "mutant ID". For example, as explained in FIG. 1, the mutant model MD11 is a 3D model in which the breast fin abnormality is reflected. Thus, in the mutant model identified by the mutant ID "MD11", the "breast fin abnormality" represents the physical abnormality of interest.

The item "video" represents the video obtained when the mutant model identified by the item "mutant ID" is implemented. For example, the video MDVD11 is obtained when the mutant model MD11 is implemented. The item "simulation result" indicates the result of fluid simulation performed with respect to the mutant model, which is identified by the item "mutant ID", in the video obtained as a result of implementation of the mutant model. For example, a simulation result SMRE11 represents the result of fluid simulation performed with respect to the mutant model MD11 in the video MDVD11 that is obtained as a result of implementation of the mutant model MD11.

The item "behavior information "swimming-style data)" represents the behavior information indicating the virtual swimming of the sturgeon having the physical abnormality seen in the mutant model identified by the item "mutant ID". For example, behavior information "STDA11" indicates the behavior that is analyzed based on the simulation result SMRE11 and that is exhibited by the sturgeon having the "breast fin abnormality" as the physical abnormality. Moreover, the item "behavior information" contains the following information as method data: information indicating the swimming style in normal times, information indicating the swimming style at the time of feeding, and information indicating the movement locus of the swimming movement.

The items "physical information" and "behavior information" represent the learning data used in the machine learning meant for generating an estimation model; and the combinations of the "physical information" and the "behavior information" serve as learning datasets.

Returning to the explanation with reference to FIG. 2, the terminal device 10 can collect the swimming-style data from the actual videos in which sturgeons are captured. As an example, the terminal device 10 can collect the swimming-style data from a video capturing the behavior exhibited by a sturgeon whose gender is already known. For example, the terminal device 10 collects the swimming-style data from a video in which the behavior exhibited by a female sturgeon is captured.

6. Extraction of Feature Quantity from Real Video

Figure 3:
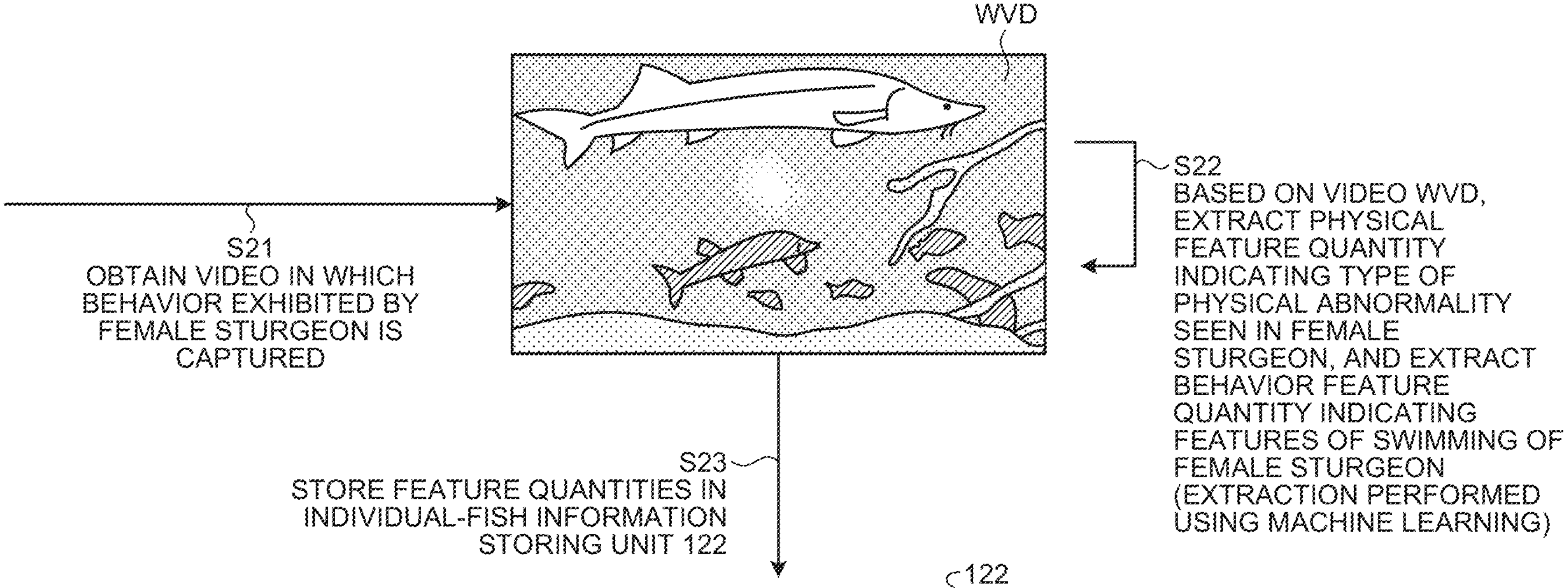
FIG. 3 is a diagram illustrating an example of extracting a feature quantity from a real video.

As explained later, in order to generate an estimation model meant for estimating the gender of a sturgeon, there are times when the learning result (feature quantity), which is obtained as a result of performing machine learning with respect to the swimming-style data obtained from an actual video of the sturgeon, is used in enforced learning. Thus, explained below with reference to FIG. 3 is an example in which the information processing device 100 extracts the feature quantity of a sturgeon from the swimming-style data collected from a video in which the behavior exhibited by the sturgeon is captured. FIG. 3 is a diagram illustrating an example of extracting the feature quantity from a real video.

In the example illustrated in FIG. 3, the information processing device 100 extracts the feature quantity of a female sturgeon from the swimming-style data collected from a video in which the behavior exhibited by the female sturgeon is captured. Hence, firstly, the information processing device 100 obtains a video in which the behavior exhibited by the female sturgeon is captured (Step S21). For example, the information processing device 100 obtains the video, in which the behavior exhibited by the sturgeon is captured, from the storage destination (for example, the terminal device 10 or a predetermined server device different than the information processing device 100). In the example illustrated in FIG. 3, the information processing device 100 obtains a video WVD as the video in which the behavior exhibited by a female sturgeon is captured.

In that state, based on the video WVD, the information processing device 100 extracts the feature quantity about the physical features indicating the type of physical abnormality seen in the female sturgeon (i.e., the physical feature quantity) and the feature quantity indicating the features of the swimming of the female sturgeon (i.e., the behavior feature quantity) (Step S22). For example, the information processing device 100 extracts such feature quantities as a result of performing machine learning.

Then, the information processing device 100 stores the extracted feature quantities in an individual-fish information storing unit 122 (Step S23). As illustrated in FIG. 3, in the individual-fish information storing unit 122, the items "feature type" and "feature quantity" are stored in a corresponding manner. As illustrated in the individual-fish information storing unit 122 in FIG. 3, the item "feature type" includes "physical feature quantity" and "behavior feature quantity". Moreover, in the individual-fish information storing unit 122 illustrated in FIG. 3, "BFV1", "BFV2", and "BFV3" are extracted as the physical feature quantities.

In FIG. 3, the physical feature quantities are indicated in the form of conceptual symbols. However, when a female sturgeon has the feature such as "the shape of the breast fin is like XXX" or "the dorsal fin tends to bend to the left side", the "feature quantity" indicating that feature is stored in a corresponding manner to the feature type "physical feature quantity". Moreover, in FIG. 3, the behavior feature quantities are indicated in the form of symbols. However, when the female sturgeon has the feature such as "the swimming tends to be at a lower height as compared to male sturgeons", the "feature quantity" indicating that feature is stored in a corresponding manner to the feature type "behavior feature quantity".

7. Example of Model Generation

Figure 4:
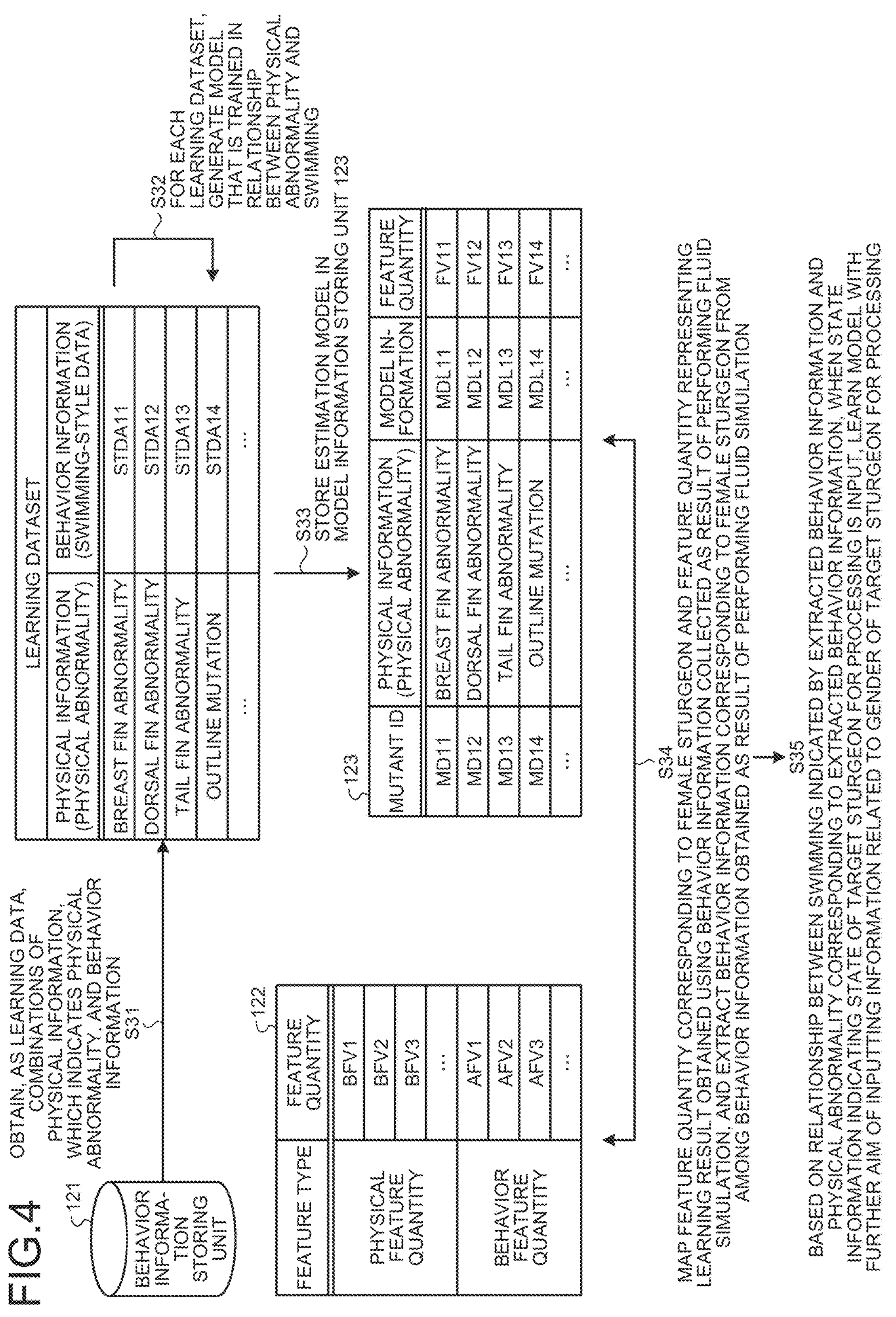
FIG. 4 is a diagram illustrating an overall example of an estimation operation according to the embodiment.

Explained below with reference to FIG. 4 is an example of a model generation operation for generating an estimation model, which is to be used in the estimation operation, as part of the estimation operation according to the embodiment as performed by the information processing device 100. FIG. 4 is a diagram illustrating an overall example of the estimation operation according to the embodiment.

Firstly, the information processing device 100 obtains, as the learning datasets from the behavior information storing unit 121, the combinations of the physical information, which indicates the physical abnormality, and the behavior information (swimming-style data), which indicates the behavior exhibited by the sturgeon, (Step S31). In the example illustrated in FIG. 4, the information processing device 100 obtains, as a single learning dataset ("learning dataset LS1"), the pair of the physical information indicating "breast fin abnormality" as the physical abnormality and the behavior information such as "STDA11" indicating the swimming.

Moreover, in the example illustrated in FIG. 4, the information processing device 100 obtains, as a single learning dataset ("learning dataset LS2"), the pair of the physical information indicating "dorsal fin abnormality" as the physical abnormality and the behavior information such as "STDA12" indicating the swimming. Furthermore, in the example illustrated in FIG. 4, the information processing device 100 obtains, as a single learning dataset ("learning dataset LS3"), the pair of the physical information indicating "tail fin abnormality" as the physical abnormality and the behavior information such as "STDA13" indicating the swimming. Moreover, in the example illustrated in FIG. 4, the information processing device 100 obtains, as a single learning dataset ("learning dataset LS4"), the pair of the physical information indicating "outline abnormality" as the physical abnormality and the behavior information such as "STDA14" indicating the swimming.

Then, for each learning dataset, based on the behavior information of the sturgeon having the physical abnormality indicated by the physical information included in the learning data (i.e., based on the behavior information included in the learning data), the information processing device 100 generates a model that is trained in the relationship between the concerned physical abnormality and the swimming (behavior) of the sturgeon having that physical abnormality (Step S32).

For example, based on the learning dataset LS1, the information processing device 100 generates an estimation model that is trained in the tendency of the swimming of the sturgeons having the breast fin abnormality. As an example, based on the learning dataset LS1, the information processing device 100 calculates the feature quantity indicating the feature of swimming of the sturgeons having the breast fin abnormality, and generates an estimation model based on the calculated feature quantity. Moreover, in response to the input of state information that is represented by the videos capturing the behavior exhibited by sturgeons and that indicates the state of the target sturgeon for processing (for example, the state of the outline or the state of the swimming), the information processing device 100 learns the estimation model with the aim of outputting the information related to the physical abnormality seen in the target sturgeon for processing. For example, when the state information indicating the state of the target sturgeon for processing is input, the information processing device 100 learns the estimation model with the aim of outputting the information indicating whether or not the target sturgeon for processing has the breast fin abnormality. In the example illustrated in FIG. 4, the information processing device 100 generates an estimation model MDL11 as the abovementioned estimation model. Moreover, "FV11" is conceptually treated as the feature quantity (the swimming tendency) to be handled in the estimation model MDL11.

Furthermore, for example, based on the learning dataset LS2, the information processing device 100 generates an estimation model that is trained in the tendency of the swimming of the sturgeons having the dorsal fin abnormality. As an example, based on the learning dataset LS2, the information processing device 100 calculates the feature quantity indicating the feature of swimming of the sturgeons having the dorsal fin abnormality, and generates an estimation model based on the calculated feature quantity. Moreover, in response to the input of state information that is represented by the videos capturing the behavior exhibited by sturgeons and that indicates the state of the target sturgeon for processing (for example, the state of the outline or the state of the swimming), the information processing device 10 learns the estimation model with the aim of outputting the information related to the physical abnormality seen in the target sturgeon for processing. For example, when the state information indicating the state of the target sturgeon for processing is input, the information processing device 100 learns the estimation model with the aim of outputting the information indicating whether or not the target sturgeon for processing has the dorsal fin abnormality. In the example illustrated in FIG. 4, the information processing device 100 generates an estimation model MDL12 as the abovementioned estimation model. Moreover, "FV12" is conceptually treated as the feature quantity (the swimming tendency) to be handled in the estimation model MDL12.

Furthermore, for example, based on the learning dataset LS3, the information processing device 100 generates an estimation model that is trained in the tendency of the swimming of the sturgeons having the tail fin abnormality. As an example, based on the learning dataset LS3, the information processing device 100 calculates the feature quantity indicating the feature of swimming of the sturgeons having the tail fin abnormality, and generates an estimation model based on the calculated feature quantity. Moreover, in response to the input of the state information that is represented by the videos capturing the behavior exhibited by sturgeons and that indicates the state of the target sturgeon for processing (for example, the state of the outline or the state of the swimming), the information processing device 10 learns the estimation model with the aim of outputting the information related to the physical abnormality seen in the target sturgeon for processing. For example, when the state information indicating the state of the target sturgeon for processing is input, the information processing device 100 learns the estimation model with the aim of outputting the information indicating whether or not the target sturgeon for processing has the tail fin abnormality. In the example illustrated in FIG. 4, the information processing device 100 generates an estimation model MDL13 as the abovementioned estimation model. Moreover, "FV13" is conceptually treated as the feature quantity (the swimming tendency) to be handled in the estimation model MDL13.

Furthermore, for example, based on the learning dataset LS4, the information processing device 100 generates an estimation model that is trained in the tendency of the swimming of the sturgeons having the outline abnormality. As an example, based on the learning dataset LS4, the information processing device 100 calculates the feature quantity indicating the feature of swimming of the sturgeons having the outline abnormality, and generates an estimation model based on the calculated feature quantity. Moreover, in response to the input of the state information that is represented by the videos capturing the behavior exhibited by sturgeons and that indicates the state of the target sturgeon for processing (for example, the state of the outline or the state of the swimming), the information processing device 100 learns the estimation model with the aim of outputting the information related to the physical abnormality seen in the target sturgeon for processing. For example, when the state information indicating the state of the target sturgeon for processing is input, the information processing device 100 learns the estimation model with the aim of outputting the information indicating whether or not the target sturgeon for processing has the outline abnormality. In the example illustrated in FIG. 4, the information processing device 100 generates an estimation model MDL14 as the abovementioned estimation model. Moreover, "FV14" is conceptually treated as the feature quantity (the swimming tendency) to be handled in the estimation model MDL14.

In this way, the information processing device 100 learns a model using, as the learning data, the behavior information that is collected as a result of performing fluid simulation with respect to a 3D model in which a physical abnormality is reflected and that indicates the behavior exhibited by the sturgeons having that physical abnormality. As a result, the information processing device 100 becomes able to learn from a large volume of behavior information that cannot be obtained just by observing the movement of the actual sturgeons, and hence can generate a learning model having a high degree of estimation accuracy. Meanwhile, with reference to FIG. 2, it is explained that the behavior information (swimming-style data) can be collected from the actual videos of the sturgeons. Accordingly, the information processing device 100 can learn, as the learning data, the hybrid of the behavior information collected as a result of performing fluid simulation and the behavior information collected from the actual videos of the sturgeons.

Then, the information processing device 100 stores the information related to the generated estimation model in a model information storing unit 123 (Step S33). In the example illustrated in FIG. 4, the model information storing unit 123 includes the following items: "mutant ID", "physical information (physical abnormality)", "model information", and "feature quantity".

The item "mutant ID" represents identification information that enables identification of the mutant model. The item "physical information (physical abnormality)" represents information indicating the physical abnormality seen in the mutant model identified by the "mutant ID". The item "model information" represents the estimation model generated by the information processing device 100. The item "feature quantity" represents the feature quantity (the swimming tendency) handled in the estimation model indicated by the item "model information". Thus, in the model information storing unit 123 illustrated in FIG. 4, it is indicated that the estimation model MDL11 is generated that is trained in the relationship between the swimming indicated by the behavior information, which is collected as a result of performing fluid simulation with respect to the mutant model MD11 in which the physical abnormality "breast fin abnormality" is reflected, and the breast fin abnormality, with the behavior information serving as the learning data. Moreover, in the model information storing unit 123 illustrated in FIG. 4, "FV11" represents the feature quantity (the swimming tendency) handled in the estimation model MDL11.

Subsequently, the information processing device 100 generates an estimation model that is trained in the relationship of the behavior information, which indicates the behavior that, from among the behavior exhibited by the sturgeons, is extracted based on the similarity between the behavior having a relationship with a predetermined physical abnormality and the behavior exhibited by a sturgeon of known gender (a female sturgeon), with the predetermined physical abnormality. In the example illustrated in FIG. 4, the information processing device 100 maps the feature quantity corresponding to the female sturgeon and the feature quantity representing the learning result obtained using the behavior information collected as a result of performing fluid simulation, and extracts the behavior information corresponding to the female sturgeon from among the behavior information obtained as a result of performing fluid simulation (Step S34).

The feature quantity corresponding to the female sturgeon is the feature quantity stored in the individual-fish information storing unit 122. Moreover, the feature quantity representing the learning result obtained using the behavior information collected as a result of performing fluid simulation is the feature quantity stored in the model information storing unit 123. Thus, in the example illustrated in FIG. 4, as a result of the mapping performed based on the similarity (commonality) between the feature quantity stored in the individual-fish information storing unit 122 and the feature quantity stored in the model information storing unit 123, the information processing device 100 extracts the behavior information corresponding to the female sturgeon from among the behavior information obtained as a result of performing fluid simulation (i.e., the behavior information stored in the behavior information storing unit 121).

Then, based on the relationship between the swimming indicated by the extracted behavior information and the physical abnormality corresponding to the extracted behavior information, when the state information indicating the state of the target sturgeon for processing is input, the information processing device 100 learns the model with the further aim of outputting the information related to the gender of the target sturgeon for processing (Step S35). For example, based on the relationship between the swimming indicated by the extracted behavior information and the physical abnormality corresponding to the extracted behavior information, the information processing device 100 performs enforced learning of the models, which are stored in the model information storing unit 123, with the further aim of outputting the information related to the gender of the target sturgeon for processing.

In the post-enforced-learning estimation model MDL11, when the state information indicating the state of the target sturgeon for processing is input, the information indicating whether or not the target sturgeon for processing has the breast fin abnormality is output along with the information indicating whether or not the target sturgeon for processing is a female sturgeon. Moreover, in the post-enforced-learning estimation model MDL12, when the state information indicating the state of the target sturgeon for processing is input, the information indicating whether or not the target sturgeon for processing has the dorsal fin abnormality is output along with the information indicating whether or not the target sturgeon for processing is a female sturgeon.

Furthermore, in the post-enforced-learning estimation model MDL13, when the state information indicating the state of the target sturgeon for processing is input, the information indicating whether or not the target sturgeon for processing has the tail fin abnormality is output along with the information indicating whether or not the target sturgeon for processing is a female sturgeon. Moreover, in the post-enforced-learning estimation model MDL13, when the state information indicating the state of the target sturgeon for processing is input, the information indicating whether or not the target sturgeon for processing has the outline abnormality is output along with the information indicating whether or not the target sturgeon for processing is a female sturgeon.

8. Example of Estimation Operation

Figure 5:
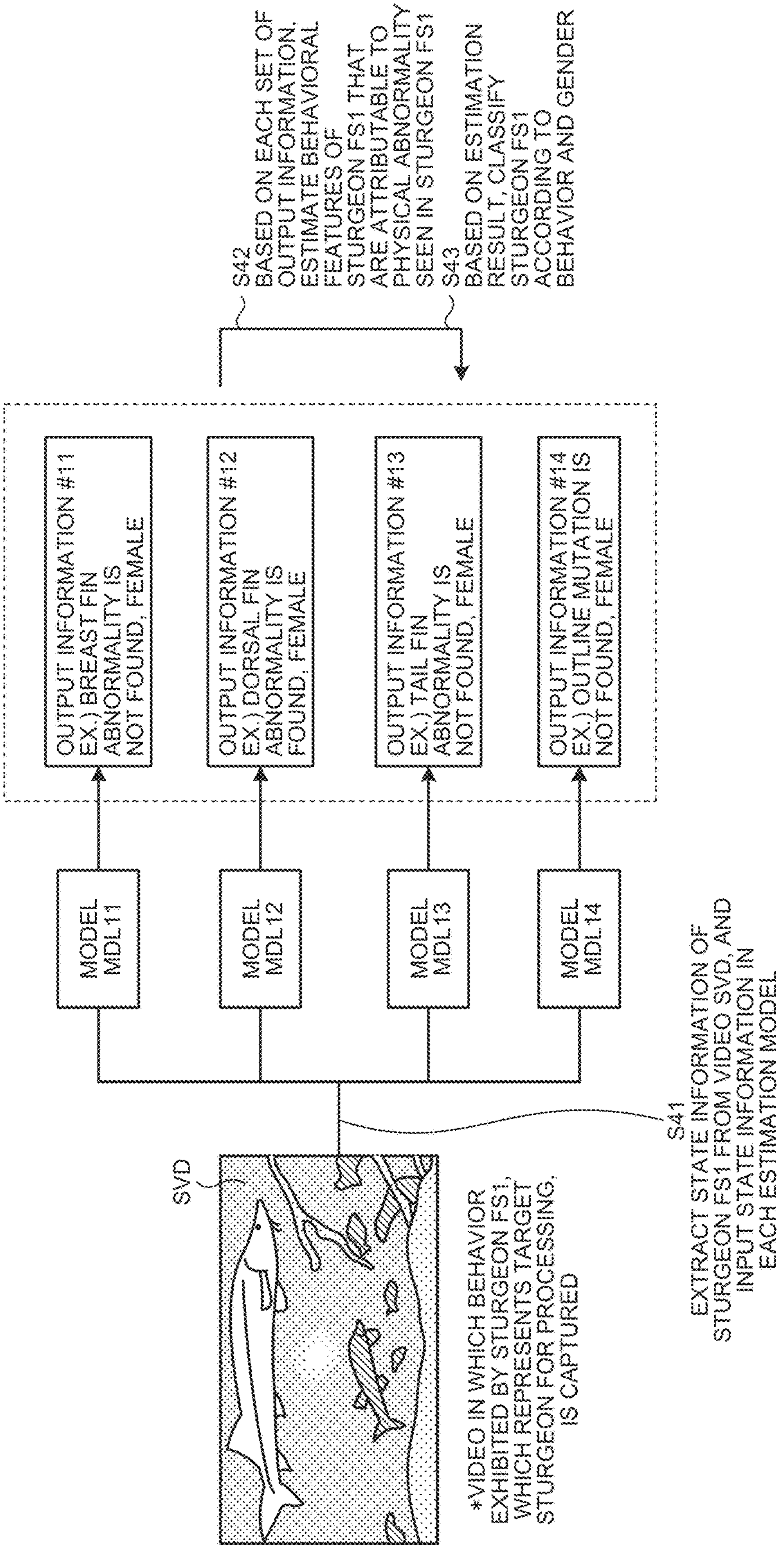
FIG. 5 is a diagram illustrating an example of the estimation operation according to the embodiment.

With reference to FIG. 5, the following explanation is given about an example of the estimation operation performed using an estimation model, from among the estimation operation according to the embodiment as performed in the information processing device 100. FIG. 5 is a diagram illustrating an example of the estimation operation according to the embodiment.

In the information processing device 100, based on the behavior information indicating the behavior exhibited by the sturgeons and based on the state information indicating the state of the target sturgeon for processing, the behavioral features of the target sturgeon for processing are estimated that are attributable to the physical abnormality seen in the target sturgeon for processing. For example, in the information processing device 100, the behavioral features of the target sturgeon for processing, which are attributable to the physical abnormality seen in the target sturgeon for processing, are estimated based on an estimation model that is trained in the relationship between the physical abnormality and the behavior exhibited by the sturgeons having that physical abnormality, and based on the state information of the target sturgeon for processing. As an example, based on the estimation models and based on the state information indicated in a video capturing the behavior or the target sturgeon for processing, the information processing device 100 estimates the behavioral features of the target sturgeon for processing. More specifically, the information processing device 100 inputs, in each estimation model, the state information indicated in a video capturing the behavior or the target sturgeon for processing; and, based on the information output from the estimation model, estimates the behavioral features and the gender of the target sturgeon for processing.

With reference to FIG. 5, a video SVD is provided in which the behavior exhibited by a sturgeon FS1 representing the target sturgeon for processing is captured; and the information processing device 100 estimates the behavioral features and the gender of the sturgeon FS1 using an estimation model. In this example, firstly, the information processing device 100 extracts the state information of the sturgeon FS1 from the video SVD, and inputs the state information in each estimation model (Step S41). More particularly, the information processing device 100 inputs the state information of the sturgeon FS1, which is extracted from the video SVD, in the post-enforced-learning estimation models MDL11, MDL12, MDL13, and MDL14.

Then, in the example illustrated in FIG. 5, in response to the input performed at Step S41, the post-enforced-learning estimation model MDL11 outputs output information #11 indicating “information related to physical abnormality: breast fin abnormality is not found; information related to gender: female” regarding the sturgeon FS1. Moreover, in the example illustrated in FIG. 5, in response to the input performed at Step S41, the post-enforced-learning estimation model MDL12 outputs output information #12 indicating “information related to physical abnormality: dorsal fin abnormality is found; information related to gender: female”

regarding the sturgeon FS1. Furthermore, in the example illustrated in FIG. 5, in response to the input performed at Step S41, the post-enforced-learning estimation model MDL13 outputs output information #13 indicating "information related to physical abnormality: tail fin abnormality is not found; information related to gender: female" regarding the sturgeon FS1. Moreover, in the example illustrated in FIG. 5, in response to the input performed at Step S41, the post-enforced-learning estimation model MDL14 outputs output information #14 indicating "information related to physical abnormality: outline abnormality is not found; information related to gender: female" regarding the sturgeon FS1.

Based on each set of output information, the information processing device 100 estimates the behavioral features of the sturgeon FS1 that are attributable to the physical abnormality seen in the sturgeon FS1 (Step S42). Moreover, based on each set of output information, the information processing device 100 also estimates the gender of the sturgeon FS1. According to the sets of output information illustrated in FIG. 5 (the output information #11, the output information #12, the output information #13, and the output information #14), it can be understood that the sturgeon FS1 has the physical abnormality in the form of the dorsal fin abnormality. With reference to the model information storing unit 123, the estimation model MDL12 corresponds to the physical abnormality in the form of "dorsal fin abnormality". More specifically, the estimation model MDL12 is the estimation model that, based on the behavior information of the sturgeons having the physical abnormality in the form of "dorsal fin abnormality" (i.e., based on the behavior information obtained as a result of performing fluid simulation with respect to the mutant model MD12 in which the physical abnormality in the form of "dorsal fin abnormality" is reflected), is trained in the relationship between the physical abnormality in the form of "dorsal fin abnormality" and the swimming (behavior) of the sturgeons having the physical abnormality in the form of "dorsal fin abnormality". Meanwhile, with reference to the model information storing unit 123, "FV12" represents the feature quantity (the swimming tendency) handled in the estimation model MDL12.

Since the sturgeon FS1 has the "dorsal fin abnormality", the information processing device 100 estimates that the swimming features (an example of the behavioral features) are as indicated by the feature quantity "FV12". Moreover, the information processing device 100 estimates that the gender of the sturgeon FS1 is "female".

Subsequently, based on the estimation result obtained at Step S42, the information processing device classifies the sturgeon FS1 according to the behavior and the gender (Step S43). For example, in a classification result storing unit 124, the information processing device 100 puts the sturgeon FS1 in the behavior group corresponding to the feature quantity "FV12" and in the group for the gender "female", and thus classifies the sturgeon FS1 according to the behavior and the gender.

With reference to FIG. 5, based on the sets of output information that is output from the post-enforced-learning estimation model, the information processing device 100 estimates the gender of the target sturgeon for processing. Alternatively, the information processing device 100 can estimate the gender of a sturgeon based on the output information obtained from the pre-enforced-learning estimation models (the estimation models generated at Step S32 illustrated in FIG. 4).

Even when the pre-enforced-learning estimation models are used, since the sturgeon FS1 has the "dorsal fin abnormality", the information processing device 100 estimates that the swimming features (an example of the behavioral features) are as indicated by the feature quantity "FV12". Thus, in this example, based on the swimming features indicated by the feature quantity "FV12", the information processing device 100 estimates the gender of the sturgeon FS1. For example, assume that the feature quantity "FV12" indicates "the swimming tends to be at a lower height in the water". Moreover, the reason for "swimming at a lower height in the water" is believed to be an increase in the body weight due to the presence of eggs. As a result, the sturgeon that "swims at a lower height in the water" can be estimated to be a female. Accordingly, based on the reason for the behavior exhibited by the sturgeon FS1 as indicated by the feature quantity "FV12", the information processing device 100 estimates the gender of the sturgeon FS1. In this example, the information processing device 100 estimates that the gender of the sturgeon FS1 is "female".

Moreover, based on the behavioral features of the target sturgeon for processing that are attributable to the physical abnormality seen in that target sturgeon for processing, the information processing device 100 can further estimate the reason for the behavior exhibited by the target sturgeon for processing as indicated by the behavioral features. Herein, for ease of explanation, assume that the feature quantity "FV12" indicates "swimming in circles in the water". If the reason for "swimming in circles in the water" is already known to be "lack of oxygen", then the information processing device 100 estimates that "lack of oxygen" is the reason for the behavior exhibited by the sturgeon FS1 as indicated by the feature quantity "FV12".

As explained till now, as a result of following the estimation program according to the embodiment, the information processing device 100 obtains the behavior information indicating the behavior exhibited by sturgeons having a predetermined physical abnormality; and, based on the obtained behavior information and based on the state information indicating the state of the target sturgeon for processing from among the sturgeons, estimates the behavioral features of the target sturgeon for processing that are attributable to the predetermined physical abnormality seen in the target sturgeon for processing. Moreover, based on the obtained behavior information, the information processing device 100 estimates the gender of the target sturgeon for processing. More specifically, as a result of following the estimation program according to the embodiment, based on the behavior information obtained from the simulation result with respect to a 3D model of sturgeons in which the predetermined physical abnormality is reflected and based on the behavior information of the female sturgeons, the information processing device 100 generates an estimation model that is trained in the relationship between the predetermined physical abnormality and the behavior exhibited by the sturgeons having the predetermined physical abnormality. For example, when the state information of the target sturgeon for processing is input, the information processing device 100 learns the estimation model with the aim of outputting the information related to the physical abnormality seen in the target sturgeon for processing, along with outputting the information related to the gender of the target sturgeon for processing.

As a result, the information processing device 100 according to the embodiment becomes able to easily classify the behavior exhibited by the sturgeons according to the behavior group or the gender. As a result of such classification, the information processing device 100 becomes able to provide an index related to the health condition of the sturgeons. Hence, for example, it becomes possible to make the user take early measures to prevent the death of those sturgeons. Moreover, the information processing device 100 can contribute in reducing the efforts of the user required in separating only the female sturgeons (i.e., the efforts required in gender determination) and reducing the cost of aquafarming (breeding).

9. Configuration of Information Processing Device

Figure 6:
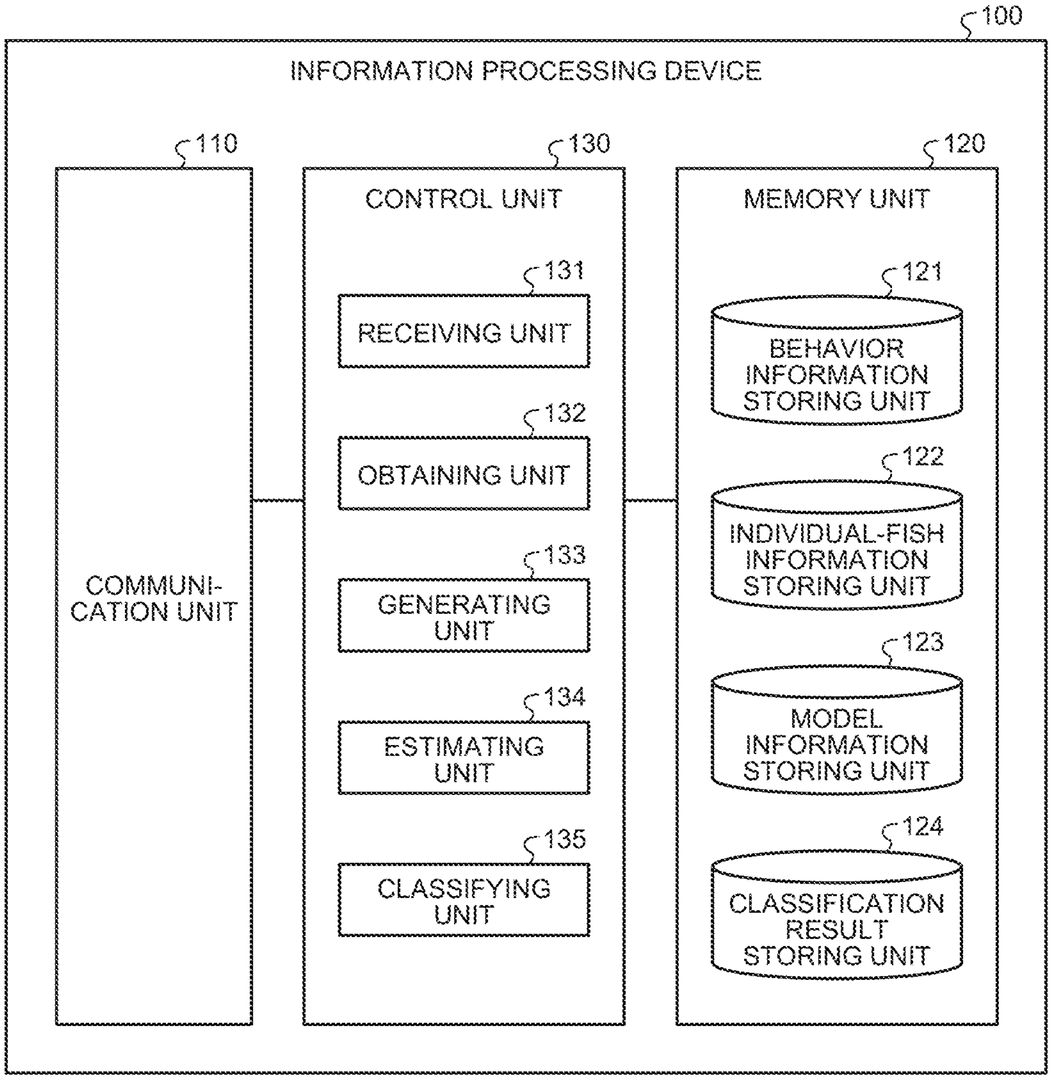
FIG. 6 is a diagram illustrating an exemplary configuration of an information processing device according to the embodiment.

With reference to FIG. 6, the explanation is given about the information processing device 100 according to the embodiment. FIG. 6 is a diagram illustrating an exemplary configuration of the information processing device 100 according to the embodiment. As illustrated in FIG. 6, the information processing device 100 includes a communication unit 110, a memory unit 120, and a control unit 130.

(Regarding Communication Unit 110)

The communication unit 110 is implemented using, for example, an NIC (Network Interface Card). The communication unit 110 is connected to a network N in a wired manner or in a wireless manner, and sends information to and receives information from the terminal device 10.

(Regarding Memory Unit 120)

The memory unit 120 is implemented using, for example, a semiconductor memory device such as a RAM (Random Access Memory) or a flash memory; or a memory device such as a hard disk or an optical disc. The memory unit 120 includes the behavior information storing unit 121, the individual-fish information storing unit 122, the model information storing unit 123, and the classification result storing unit 124. Regarding the behavior information storing unit 121, the individual-fish information storing unit 122, and the model information storing unit 123; the explanation is already given earlier. Hence, the detailed explanation is not repeated.

(Regarding Classification Result Storing Unit 124)

The classification result storing unit 124 is used to store the classification result obtained by classifying the target sturgeon for processing according to the behavior or the gender. Explained below with reference to FIG. 8 is an example of the classification result storing unit 124 according to the embodiment. In the example illustrated in FIG. 8, the classification result storing unit 124 includes items "gender" and "behavior group". Moreover, in the example illustrated in FIG. 8, the item "gender" includes items "male" and "female". Furthermore, in the example illustrated in FIG. 8, the item "behavior group" includes items indicating the feature quantity (the swimming tendency), such as "FV11", "FV12", and "FV13".

Returning to the explanation with reference to FIG. 6, the control unit 130 is implemented when a CPU (Central Processing Unit) or an MPU (Micro Processing Unit) uses a RAM as the work area and executes various programs (for example, the estimation program according to the embodiment) that are stored in an internal memory device of the information processing device 100. Alternatively, the control unit 130 is implemented using, for example, an integrated circuit such as an ASIC (Application Specific Integrated Circuit) or an FPGA (Field Programmable Gate Array).

As illustrated in FIG. 6, the control unit 130 includes a receiving unit 131, an obtaining unit 132, a generating unit 133, an estimating unit 134, and a classifying unit 135; and implements or executes the functions and the actions of the information processing explained below. However, the internal configuration of the control unit 130 is not limited to the configuration illustrated in FIG. 6. Thus, as long as the information processing explained below can be performed, any other configuration can be adapted. Moreover, the connection relationship among the processing units of the control unit 130 is not limited to the connection relationship illustrated in FIG. 6, and some other connection relationship can also be adapted.

(Regarding Receiving Unit 131)

The receiving unit 131 receives (obtains) a variety of information. For example, the receiving unit 131 receives the behavior information that is based on the fluid simulation performed with respect to 3D models and that virtually indicates the behavior exhibited by a specific fish species having a predetermined physical abnormality. In the example illustrated in FIG. 2, the receiving unit 131 receives the following from the terminal device 10: swimming-style data (an example of the behavior information) representing the information related to the swimming of the sturgeons having the breast fin abnormality; swimming-style data (an example of the behavior information) representing the information related to the swimming of the sturgeons having the dorsal fin abnormality; swimming-style data (an example of the behavior information) representing the information related to the swimming of the sturgeons having the tail fin abnormality; and swimming-style data (an example of the behavior information) representing the information related to the swimming of the sturgeons having the outline mutation.

The obtaining unit 132 obtains the behavior information indicating the behavior exhibited by a specific fish species having a predetermined physical abnormality. For example, the obtaining unit 132 obtains, as the behavior information, behavior information obtained from a video indicating the behavior pattern of the specific fish species. For example, the obtaining unit 132 obtains behavior information obtained from a video that indicates the behavior pattern in response to the implementation of a three-dimensional model in which the body of the specific fish species is reproduced according to the actual musculoskeletal status of the specific fish species and in which the predetermined physical abnormality is reflected. For example, the obtaining unit 132 obtains, as the behavior information, behavior information obtained from each video that indicates the behavior pattern in response to the implementation of a three-dimensional model in which a predetermined physical abnormality is individually reflected. More specifically, the obtaining unit 132 obtains, as the behavior information, behavior information based on the fluid simulation performed with respect to the three-dimensional models in the videos obtained as a result of implementing the three-dimensional models.

Moreover, the obtaining unit 132 can obtain, as the behavior information, behavior information obtained from the video in which the behavior exhibited by a specific fish species in the water is captured. For example, the obtaining unit 132 can obtain, as the behavior information, behavior information obtained from the video in which the behavior exhibited by the fish of known gender is captured from among the specific fish species.

For example, when the timing for the generating unit 133 to perform the model generation operation is determined to have arrived, the obtaining unit 132 obtains the behavior information from the behavior information storing unit 121 as explained above.

(Regarding Generating Unit 133)

Based on the behavior information corresponding to the specific fish species having the predetermined physical abnormality, the generating unit 133 generates a model (an estimation model) that is trained in the relationship between the predetermined physical abnormality and the behavior exhibited by the specific fish species having the predetermined abnormality. For example, when the state information is input, the generating unit 133 generates a model by performing learning with the aim of outputting the information related to the predetermined physical abnormality seen in the target fish for processing.

For example, assume that the obtaining unit 132 obtains, as the behavior information, behavior information obtained from a video in which the behavior pattern of the specific fish species is captured. In that case, based on the behavior information obtained from the video, the generating unit 133 generates a model that is trained in the relationship between the predetermined physical abnormality and the behavior. More specifically, assume that the obtaining unit 132 obtains, as the behavior information, behavior information obtained from each video that indicates the behavior pattern in response to the implementation of a three-dimensional model in which a predetermined physical abnormality is individually reflected. In that case, based on the behavior information, the generating unit 133 generates a plurality of models corresponding to each predetermined physical abnormality. Regarding that point, the following explanation is given with reference to the examples illustrated in FIGS. 1 to 4. More specifically, the obtaining unit 132 obtains, as the behavior information, behavior information based on the fluid simulation performed with respect to the three-dimensional models in the videos obtained as a result of implementing the three-dimensional models. Then, the generating unit 133 uses, as the learning data, the information that is indicated by the behavior information based on the fluid simulation and that is related to the swimming of the specific fish species, and generates a model that is trained in the relationship between the predetermined physical abnormality and the behavior.

Moreover, the generating unit 133 can generate a model by further using the behavior information that is obtained from a video in which the behavior exhibited by the specific fish species in the water is captured (for example, a video in which the behavior exhibited by the fish of known is captured). In that case, the generating unit 133 uses, as the learning data, the information related to the swimming of the specific fish species as indicated by the behavior information, and generates a model that is trained in the relationship between the predetermined physical abnormality and the behavior.

Furthermore, for example, the generating unit 133 can generate a model that is trained in the relationship between the behavior information, which indicates the behavior that, from among the behavior exhibited by the specific fish species, is extracted based on the similarity between the behavior having a relationship with a predetermined physical abnormality and the behavior exhibited by a fish of known gender, and the predetermined physical abnormality. For example, when the state information is input, the generating unit 133 generates a model by performing learning with the further aim of outputting the information related to the gender of the target fish for processing.

(Regarding Estimating Unit 134)

The estimating unit 134 estimates, based on the behavior information that is obtained by the obtaining unit 132 and based on the state information that indicates the state of the target fish for processing from the specific fish species, the behavioral features of the target fish for processing that are attributable to the predetermined physical abnormality seen in the target fish for processing. For example, the estimating unit 134 estimates the behavioral features based on the behavior information and based on the state information indicated in the video in which the behavior exhibited by the target fish for processing is captured.

For example, based on the model generated by the generating unit 133 and based on the state information, the estimating unit 134 estimates the behavioral features that are attributable to the predetermined physical abnormality. For example, based on the information related to the physical abnormality that is output from a model to which the state information is provided as the input, the estimating unit 134 estimates the behavioral features attributable to the predetermined physical abnormality. Moreover, for example, based on the information related to the gender output from a model to which the state information is provided as the input, the estimating unit 134 estimates the gender of the target fish for processing.

(Regarding Classifying Unit 135)

The classifying unit 135 classifies the target fish for processing based on the estimation result obtained using a model. For example, based on the estimation result obtained using a model, the classifying unit 135 classifies the target fish for processing according to the behavior or the gender. For example, as explained with reference to FIG. 5, the classifying unit 135 puts, in the classification result storing unit 124, the target fish for processing in the behavior group corresponding to the estimated behavioral features (feature quantities). Moreover, the classifying unit 135 puts the target fish for processing in the gender group corresponding to the estimated gender.

10. Sequence of Operations

Figure 9:
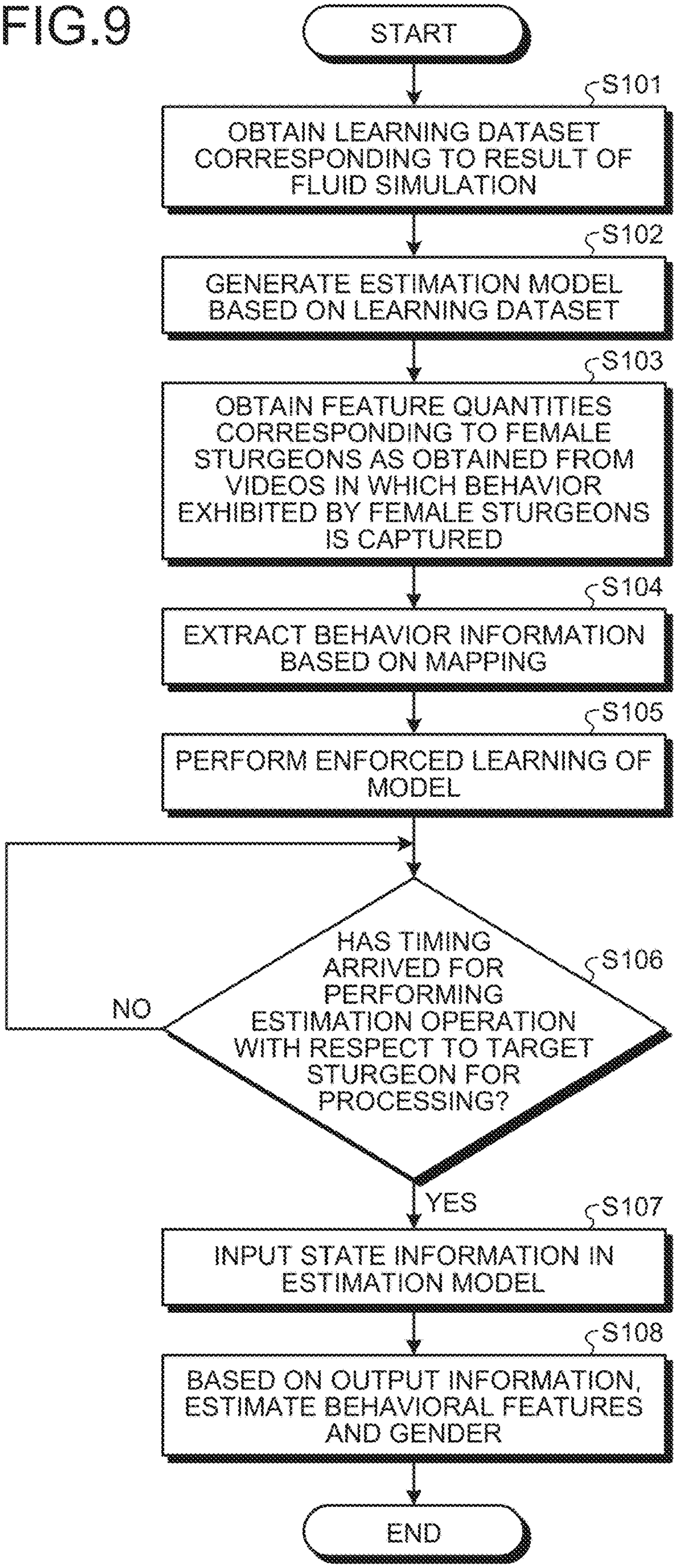
FIG. 9 is a flowchart for explaining an information processing step according to the embodiment.

Explained below with reference to FIG. 9 is a sequence of the estimation operation according to the embodiment. FIG. 9 is a flowchart for explaining an information processing step according to the embodiment. In the example illustrated in FIG. 9, it is assumed that the sturgeons represent the specific fish species. Moreover, in the example illustrated in FIG. 9, it is assumed that, based on a video in which the behavior of a female sturgeon is captured, the generating unit 133 of the information processing device 100 has extracted the physical feature quantity indicating the type of physical abnormality seen in the female sturgeon and has extracted the behavior feature quantity indicating the features of the swimming of the female sturgeon; and the extracted feature quantity is stored in the individual-fish information storing unit 122.

Firstly, the obtaining unit 132 obtains a learning dataset corresponding to the simulation result obtained as a result of performing fluid simulation with respect to a 3D model (a mutant model) in which a physical abnormality is reflected (Step S101). For example, the obtaining unit 132 obtains a learning dataset that represents a combination of the behavior information (swimming-style data), which is collected as a result of performing fluid simulation with respect to a 3D model in which a physical abnormality is reflected, and the physical information indicating the physical abnormality. For example, the obtaining unit 132 obtains a learning dataset from the behavior information storing unit 121.

Then, based on the learning dataset obtained by the obtaining unit 132, the generating unit 133 generates an estimation model for each learning dataset (Step S102).

More particularly, based on the behavior information of the sturgeons having the physical abnormality specified in the single learning dataset to be processed (i.e., the behavior information included in that learning dataset), the generating unit 133 generates an estimation model that is trained in the relationship between the predetermined physical abnormality and the behavior of the sturgeons having that physical abnormality. For example, when the state information of the target sturgeon for processing is input, the generating unit 133 generates an estimation model that outputs the information related to the physical abnormality seen in the target sturgeon for processing.

Moreover, the obtaining unit 132 obtains the feature quantities (the physical feature quantity and the behavior feature quantity) corresponding to the female sturgeons as obtained from the videos in which the behavior exhibited by the female sturgeons is captured (Step S3103). For example, the obtaining unit 132 obtains the feature quantities from the individual-fish information storing unit 122. The obtaining unit 132 can obtain the feature quantities at any arbitrary timing.

Then, the generating unit 133 performs mapping of the feature quantities corresponding to the female sturgeons and the feature quantities representing the learning result obtained as a result of using the behavior information obtained due to the fluid simulation (i.e., the learning result obtained at Step S102), and extracts the behavior information corresponding to the female sturgeons from among the behavior information obtained from the fluid simulation (Step S104).

Subsequently, based on the relationship between the behavior indicated by the extracted behavior information and the physical abnormality corresponding to the extracted behavior information, when the state information indicating the state of the target sturgeon for processing is input, the generating unit 133 performs enforced learning of the estimation model with the further aim of outputting the information related to the gender of the target sturgeon for processing (Step S105).

Moreover, in the state in which the estimation model is generated as a result of the operations at Steps S101 to S105, the estimating unit 134 determines whether or not the timing has arrived for performing the estimation operation with respect to the target sturgeon for processing (Step S106). For example, based on whether or not a video capturing the behavior of the target sturgeon for processing is input, the estimating unit 134 determines whether or not the timing has arrived for performing the estimation operation with respect to the target sturgeon for processing. For example, until the input of a video capturing the behavior of the target sturgeon for processing is received (No at Step S106), the estimating unit 134 determines that the timing for performing the estimation operation with respect to the target sturgeon for processing has not arrived, and waits till the arrival of the timing for performing the estimation operation with respect to the target sturgeon for processing.

On the other hand, when the input of a video capturing the behavior of the target sturgeon for processing is received (Yes at Step S106), the estimating unit 134 determines that the timing for performing the estimation operation with respect to the target sturgeon for processing has arrived; extracts the state information of the target sturgeon for processing from the video; and inputs the extracted state information to each estimation model (Step S107).

Then, based on the output information that is output as a result of inputting the state information, the estimating unit 134 estimates the behavioral features of the target sturgeon for processing that are attributable to the physical abnormality seen in the target sturgeon for processing, as well as estimates the gender of the target sturgeon for processing (Step S108).

11. Hardware Configuration

Figure 10:
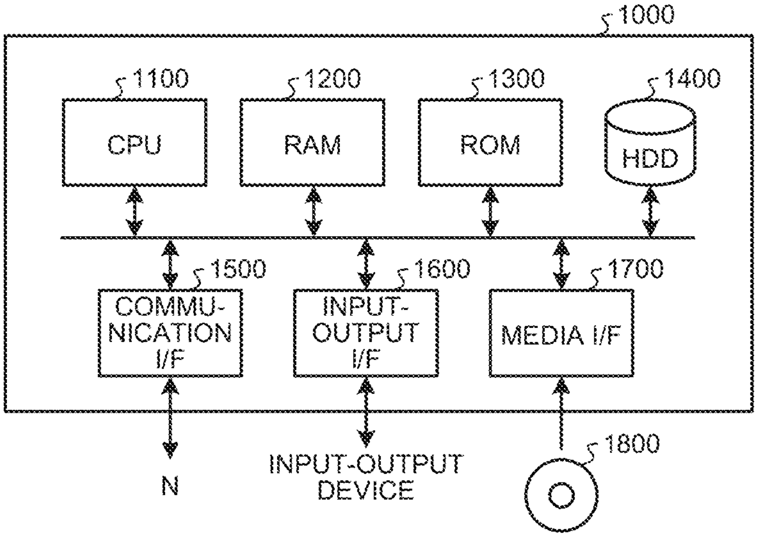
FIG. 10 is a hardware configuration example illustrating an example of a computer 1000 that implements the functions of the information processing device 100.

The information processing device 100 according to the embodiment is implemented using, for example, a computer 1000 having a configuration as illustrated in FIG. 10. FIG. 10 is a hardware configuration example illustrating an example of the computer 1000 that implements the functions of the information processing device 100. The computer 1000 includes a CPU 1100, a RAM 1200, a ROM 1300, an HDD 1400, a communication interface (I/F) 1500, an input-output interface (I/F) 1600, and a media interface (I/F) 1700.

The CPU 1100 performs operations based on a program stored in the ROM 1330 or in the HDD 1400, and controls the other constituent elements. The ROM 1300 is used to store a boot program that is executed by the CPU 1100 at the time of booting of the computer 1000, and to store the programs that are dependent on the hardware of the computer 1000.

The HDD 1400 is used to store the programs to be executed by the CPU 1100, and to store the data used in those programs. The communication interface 1500 receives data from other devices via a communication network 50 and sends that data to the CPU 1100; as well as sends the data generated by the CPU 1100 to other devices via the communication network 50.

The CPU 1100 controls, via the input-output interface 1600, output devices, such as a display and a printer, and input devices, such as a keyboard and a mouse. The CPU 1100 obtains data from an input device via the input-output interface 1600. Moreover, the CPU 1100 outputs the generated data to an output device via the input-output interface 1600.

The media interface 1700 reads the programs and the data stored in the recording medium 1800, and provides them to the CPU 1100 via the RAM 1200. The CPU 1100 loads the programs from the recording medium 1800 in the RAM 1200 via the media interface 1700, and executes the programs. The recording medium 1800 is, for example, an optical recording medium such as a DVD (Digital Versatile Disc) or a PD (Phase change rewritable Disk); or a magneto-optical recording medium such as an MO (Magneto-Optical disk); or a tape medium; or a magnetic recording medium; or a semiconductor memory.

For example, when the computer 1000 functions as the information processing device 100 according to the embodiment, the CPU 1100 of the computer 1000 executes programs loaded in the RAM 1200 and implements the functions of the control unit 130. Moreover, the HDD 1400 is used to store the data that was stored in the memory unit 120. Herein, the CPU 1100 of the computer 1000 reads the program from the recording medium 1800 and executes them. Alternatively, as another example, the CPU 1100 of the computer 1000 can obtain the programs from other devices via the communication network 50.

12. Miscellaneous

The constituent elements of the device illustrated in the drawings are merely conceptual, and need not be physically configured as illustrated. The constituent elements, as a whole or in part, can be separated or integrated either functionally or physically based on various types of loads or use conditions.

Till now, the embodiment of the application concerned was described in detail based on the accompanying drawings. However, that embodiment is only exemplary, and is to be construed as embodying all modifications and alternative constructions that may occur to one skilled in the art that fairly fall within the basic teaching herein set forth.

Moreover, the terms "section", "module", and "unit" mentioned above can be read as "device" or "circuit". For example, an obtaining unit can be read as an obtaining device or an obtaining circuit.

REFERENCE SIGNS LIST

100 information processing device
120 memory unit
121 behavior information storing unit
122 individual-fish information storing unit
123 model information storing unit
124 classification result storing unit
130 control unit
131 receiving unit
132 obtaining unit
133 generating unit
134 estimating unit
135 classifying unit

The invention claimed is:

1. A non-transitory computer readable storage medium having stored therein an estimation program that causes a computer to execute:

obtaining behavior information indicating behavior exhibited by a specific fish species having a predetermined physical abnormality, the behavior information indicating a behavior pattern of a three-dimensional model in which a body of the specific fish species is reproduced and the predetermined physical abnormality is reflected, the behavior information being generated based on a video capturing the behavior pattern when the three-dimensional model is virtually operated;

generating, based on the behavior information corresponding to the specific fish species having the predetermined physical abnormality, a model trained in a relationship between the predetermined physical abnormality and behavior exhibited by the specific fish species having the predetermined physical abnormality; and estimating, based on the model and based on state information indicating state of a target fish for processing, a behavioral feature of the target fish for processing that is attributable to the predetermined physical abnormality seen in the target fish for processing.

2. The non-transitory computer readable storage medium according to claim 1, wherein estimating, based on the behavior information and based on the state information indicated by a video in which behavior exhibited by the target fish for processing is captured, behavioral feature attributable to the predetermined physical abnormality.

3. The non-transitory computer readable storage medium according to claim 1, wherein when the state information is input, generating, as the model, a model that outputs information related to the predetermined physical abnormality seen in the target fish for processing, and estimating, based on the information output from the model, behavioral feature attributable to the predetermined physical abnormality.

4. The non-transitory computer readable storage medium according to claim 1, wherein obtaining, as the behavior information, behavior information obtained from each video in which the behavior pattern is captured in response to implementation of each three-dimensional model in which the predetermined physical abnormality is individually reflected, and generating, based on the behavior information, a plurality of models corresponding to each of the predetermined physical abnormality.

5. The non-transitory computer readable storage medium according to claim 1, wherein obtaining, as the behavior information, behavior information based on fluid simulation performed with respect to the three-dimensional model in a video obtained in response to implementation of the three-dimensional model, and using, as learning data, information that is indicated by behavior information based on the fluid simulation and that is related to swimming of the specific fish species, and generating a model trained in relationship between the predetermined physical abnormality and the behavior.

6. The non-transitory computer readable storage medium according to claim 1, wherein obtaining, as the video, the behavior information obtained from a video in which behavior exhibited by the specific fish species in water is captured.

7. The non-transitory computer readable storage medium according to claim 6, wherein obtaining, as the video, a video in which behavior exhibited by fish of known gender is captured from among the specific fish species.

8. The non-transitory computer readable storage medium according to claim 6, wherein using, as learning data, information that is indicated by the behavior information and that is related to swimming of the specific fish species, and generating a model trained in relationship between the predetermined physical abnormality and the behavior.

9. The non-transitory computer readable storage medium according to claim 7, wherein generating a model that is trained in relationship between behavior information indicating behavior extracted based on similarity, from among behavior of the specific fish species, between behavior having relationship with the predetermined physical abnormality and behavior of fish of known gender, and the predetermined physical abnormality.

10. The non-transitory computer readable storage medium according to claim 9, wherein generating, as the model, a model that, when the state information is input, further outputs information related to gender of the target fish for processing, and estimating gender of the target fish for processing based on the information related to gender as output from the model.

11. The non-transitory computer readable storage medium according to claim 1, wherein estimating further gender of the target fish for processing based on estimated behavioral feature.

12. An estimation method implemented in an information processing device, comprising:

obtaining behavior information indicating behavior exhibited by a specific fish species having a predetermined physical abnormality, the behavior information indicating a behavior pattern of a three-dimensional model in which a body of the specific fish species is reproduced and the predetermined physical abnormality is reflected, the behavior information being generated based on a video capturing the behavior pattern when the three-dimensional model is virtually operated;

generating, based on the behavior information corresponding to the specific fish species having the predetermined physical abnormality, a model trained in a relationship between the predetermined physical abnormality and behavior exhibited by the specific fish species having the predetermined physical abnormality; and estimating, based on the model and based on state information indicating state of a target fish for processing, a behavioral feature of the target fish for processing that is attributable to the predetermined physical abnormality seen in the target fish for processing.

13. An information processing device comprising:

circuitry configured to:

obtain behavior information indicating behavior exhibited by a specific fish species having a predetermined physical abnormality, the behavior information indicating a behavior pattern of a three-dimensional model in which a body of the specific fish species is reproduced and the predetermined physical abnormality is reflected, the behavior information being generated based on a video capturing the behavior pattern when the three-dimensional model is virtually operated;

generate, based on the behavior information corresponding to the specific fish species having the predetermined physical abnormality, a model trained in a relationship between the predetermined physical abnormality and behavior exhibited by the specific fish species having the predetermined physical abnormality; and estimate, based on the model and based on state information indicating state of a target fish for processing, a behavioral feature of the target fish for processing that is attributable to the predetermined physical abnormality seen in the target fish for processing.

14. The non-transitory computer readable storage medium according to claim 1, wherein the three-dimensional model is reproduced based on actual musculoskeletal status of the specific fish species.

15. The non-transitory computer readable storage medium according to claim 14, wherein the behavior information includes swimming-style data indicating a swimming style in normal times, a swimming style at a time of feeding, and a movement locus of swimming movement.

16. The non-transitory computer readable storage medium according to claim 1, wherein generating the model further comprises using, as learning data, a combination of the behavior information generated based on the video capturing the behavior pattern when the three-dimensional model is virtually operated and behavior information obtained from a video in which behavior exhibited by the specific fish species in water is captured.

17. The non-transitory computer readable storage medium according to claim 1, further causing the computer to execute: estimating, based on the estimated behavioral feature, a reason for behavior exhibited by the target fish for processing.

18. The non-transitory computer readable storage medium according to claim 14, wherein the three-dimensional model is generated by reproducing a base three-dimensional model from the actual musculoskeletal status of the specific fish species, and reflecting the predetermined physical abnormality in the base three-dimensional model.

19. The non-transitory computer readable storage medium according to claim 1, wherein the predetermined physical abnormality includes at least one of a fin abnormality and an outline mutation.

20. The non-transitory computer readable storage medium according to claim 1, further causing the computer to execute: classifying the target fish for processing according to at least one of a behavior group corresponding to the estimated behavioral feature and a gender of the target fish for processing.

* * * * *